United States Patent [19]

Thatte et al.

[11] Patent Number: 4,853,842
[45] Date of Patent: Aug. 1, 1989

[54] COMPUTER MEMORY SYSTEM HAVING PERSISTENT OBJECTS

[75] Inventors: Satish M. Thatte, Richardson; Donald W. Oxley, Carrollton, both of Tex.

[73] Assignee: Texas Instruments Incorporated, Dallas, Tex.

[21] Appl. No.: 159,467

[22] Filed: Feb. 19, 1988

Related U.S. Application Data

[63] Continuation of Ser. No. 774,826, Sep. 11, 1985, abandoned.

[51] Int. Cl.[4] .............................................. G06F 12/00
[52] U.S. Cl. ................................................... 364/200
[58] Field of Search ... 364/200 MS File, 900 MS File

[56] References Cited

U.S. PATENT DOCUMENTS 4,121,286 10/1978 Venton et al. ...................... 364/200

Primary Examiner—Raulfe B. Zache
Attorney, Agent, or Firm—Thomas G. Devine; James T. Comfort; Melvin Sharp

[57] ABSTRACT

A uniform memory system for use with symbolic computers has a very large virtual address space. No separate files, not directly addressable in the address space of the virtual memory, exist. A special object, the persistent root, defines memory objects which are relatively permanent, such objects being traceable by pointers from the persistent root. A tombstone mechanism is used to prevent objects from referencing deleted objects.

11 Claims, 3 Drawing Sheets

COMPUTER MEMORY SYSTEM HAVING PERSISTENT OBJECTS

This application is a continuation of application Ser. No. 774,826, filed Sept. 11, 1985, abandoned.

This application is related to the copending U.S. application titled RECOVERABLE VIRTUAL MEMORY, filed Sept. 11, 1985 Ser. No. 774,828, assigned to the assignee hereof, the whole of which is hereby incorporated by reference herein, and the U.S. application titled RECOVERABLE VIRTUAL MEMORY HAVING RESILIENT OBJECTS, filed Sept. 11, 1985, Ser. No. 774,827, assigned to the assignee hereof, the whole of which is also incorporated by reference herein.

BACKGROUND AND SUMMARY OF THE INVENTION

This invention relates to digital computer systems, and more specifically to memory systems therefor.

In the future, as users of state-of-the-art symbolic computing machines develop large-scale, knowledge-based applications, they are expected to encounter major problems arising out of storage management problems in supporting large and complex knowledge/data bases. The word storage is used in a broad sense to encompass virtual memory, file systems and databases. The problems can be primarilly attributed to the dichotomy by which today's computers, including state-of-the-art symbolic computers such as the Texas Instruments EXPLORER and the Symbolics 3670, manage storage along two entirely different organizations. These organizations can be referred to as the computational storage and the long-term storage.

In symbolic/artificial intelligence (AI) processing, a representation of knowledge is a combination of data structures and interpretive procedures that, if used in the right way in a program, will lead to "knowledgeable" behaviior. The goals of AI systems can be described in terms of cognitive tasks like recognizing objects, answering questions, and manipulating robotic devices. The most important consideration in formulating a knowledge representation scheme is the eventual use of the knowledge. The actual use of the knowledge in symbolic/AI programs involves three stages: (1) acquiring more knowledge, (2) retrieving facts from the knowledge base relevant to the problem at hand, and (3) reasoning about these facts in search of solutions. A number of different knowledge representation schemes, such as state-space representation, logic, procedural representation, semantic nets, production systems, and frames, have been developed by the knowledge representation community. The choice of the knowledge representation scheme very much depends on the applicaton requirements.

No matter which knowledge representation scheme is used, at some sufficiently low level of representation the knowledge is represented by memory objects interconnected by pointers. These objects exhibit a structure, which is defined by the interconnection graph of pointers connecting the objects. The structure of objects created and manipulated by symbolic/AI applications is usually very rich and complex. Moreover, both the information in objects, as well as the structure of objects, can undergo rapid changes.

In symbolic computing, objects representing a knowledge base are created and manipulated in the computational storage. As its name implies, the computational storage contains objects to be manipulated by the processor of a computer system. These objects can be numbers, strings, vectors, arrays, records, linked lists, instructions, procedures, etc. These objects, both small and large, are usually identified by names. The names of objects serve as convenient handles or pointers that can passed as procedure parameters, returned as procedure results, and stored in other objects as components. The names of objects are typically implemented as their virtual addresses. Programmers create and manipulate objects by using programming languages, such as LISP and Prolog.

Typically, the computational storage is implemented as virtual memory, which consists of a hierarchy of memories: a fast, small semiconductor main memory, backed up by a slow, large disk to support paging. Objects in the computational storage are accessed very rapidly as the processor can directly access them by specifying their addresses (real or virtual), often at a speed that matches the basic processor cycle time. The information stored in these objects is also processed and manipulated very efficiently as it is stored in a format defined by the processor architecture, and can therefore be directly interpreted by the processor hardware or microcode.

Often, the information stored in the computational storage has a very rich structure; i.e., objects in the computational storage are interconnected by a rich and complex structure of pointers to match the requirements of applications at hand. The structure of these objects is often dynamic. However, objects in the computational storage do not exist beyond the life times of programs that create them. When a program terminates or a system shutdown, or crash occurs, these objects cease to exist. Therefore, they are called short-lived or transient objects. To make these objects survive beyond the life times of programs that created them, i.e., to make them long-lived or persistent, they must be moved to the other storage organization, i.e., the long-term storage.

As its name implies, the long-term storage is used to keep information for long periods of time. It is typically implemented on a disk-resident file system. The disk file system is logically different from the paging disk of the computational storage, even though the physical disk media may be shared by both. Examples of information stored in the long-term storage are files, directories, libraries, and databases. The long-term storage retains information in a reliable fashion for long periods of time. In order to store information beyond the life time of a program that creates it in the computational storage, the information needs to be first mapped into a representation expected by the long-term storage and then transferred to it for long-term retention using a file input-/output (I/O) operation or a database operation.

The types of objects supported by the long-term storage are very restrictive (essentially files, directories, relations, etc.), and may match with the data structure requirements of many applications. The representation of information in the long-term storage is quite "flat." For example, a file may consist of a sequential stream of bits or bytes, such as ASCII characters. Files or relations usually can neither hold procedural objects nor pointers to other objects in the long-term storage. Information in these objects can neither be directly addressed nor directly processed by the processor, because its representation is not compatible with the processor architecture. The information can be processed only after it is mapped into a representation expected by the computational storage and then transferred to it for processing. The translation overhead in mapping these objects to/from a collection of files is quite substantial, too.

In addition to the time overhead for translation and mapping of objects between the computational and long-term storage, there is additional space overhead, as the information is essentially duplicated in virtual memory and the file system. There is an apparent paradox in that the computational storage, usually implemented as a virtual memory, hides the existence of the paging disk store; on the other hand, the long-term storage makes the existence of the disk explicit to the programmer. Thus, the programmer is faced with a nonuniform storage model, where differences in addressing, function, and retention characteristics between the computational and long-term storages are visible above the processor architecture level.

Programming languages, such as FORTRAN, Pascal, LISP, and Prolog, strongly reflect the dichotomy in storage organization. The specification of these languages almost invariably assumes long-term storage objects (files) to have entirely different characteristics from computational objects. As a result, these programming languages cannot directly process information in the long-term storage the way they can process information in the computational storage. This dichotomy propagates througout the whole system and cannot be hidden from the user. It shows up in differences between names used for programming language objects and names used for files and databases.

The dichotomy also shows up in a different set of languages that has evolved to process information in the long-term storage. These languages include various so-called command languages, such as the UNIX shell language and the IBM TSO Command Language, that are responsible, among other things, for performing operations on files. The other class of languages which operate on persistent objects are various database languages, such as Square, Sequel, and Quel. These languages can define database objects, and perform queries and updates on them. Typically, such languages are often interpreted, and are restrictive and arcane in nature compared to the more familiar programming languages, which also enjoy the efficiency of compiled execution over interpreted execution.

As a consequence, the programmer must be aware of the nonuniform storage model, and must explicitly move information among storage media, based on the addressing mechanisms, functions and retention characteristics desired. Another consequence is that the nonuniform storage model is an obstacle to programming generality and modularity as it increases potential types of interfaces among programs. The hodgepodge of mode-dependent programming languages, such as command languages, programming languages, debugging languages, and editing languages, makes fast and efficient interaction with the system difficult.

The mapping between transient and persistent objects is usually done in part by the file system or the data base management system (DBMS) and in part by explicit user translation code which has to be written and included in each program. This task imposes both space and time penalties, and degrades system performance. Frequently the programmer is distracted from his task by the difficulties of understanding the mapping and managing the additional burden of coping with two disparate worlds: the programming language world and the DBMS world.

In large data-intensive programs there is usually a considerable amount of code, which has been estimated to be as high as 30% of the total, concerned with transferring data between files or a database, and the computational storage. Much space and time is wasted by code to perform translations between the transient and persistent object worlds, which has adverse performance impact. This is unsatisfactory because the effort and time required to develop and execute the translation code can be considerable, and also because the quality and reliability of the application programs may be impaired by the mapping. The storage dichotomy also gives rise to much duplication of effort in the operating system design and DBMS design.

These problems, created by the storage dichotomy, are considerably further complicated for symbolic/AI computing. Processes on current symbolic machines share a single address space; i.e., there is no per-process address space. Moreover, the address space is not segmented, but is a single, linear address space. Such a model of the computational storage allows easy, efficient and flexible sharing of objects among multiple processes. Any object can point to any other object by simply holding a pointer to that object (usually implemented as a virtual address of the object being pointed to). Arbitrarily complex structures of objects interconnected by pointers can be created and manipulated. Such powerful structuring of objects is very important for the development of the highly integrated and powerful software development environments available on these symbolic computers.

Unfortunately, current symbolic computers make a distinction between the computational and long-term storages, similar to today's conventional computers. In symbolic computers, making a single object persistent by moving it to a file system is not very meaningful; all objects that can be reached from an object by following all out-going pointers also need to be made persistent as a single entity, and all in-coming pointers pointing to the entity must be "properly taken care of." Such an entity, however, can be very large and moving it to a file system would be a complicated and expensive operation. Conversely, the reverse move from a file system to the computational storage would be equally as complicated and expensive.

Many current advanced programming techniques, especially as practiced in the symbolic/AI community, do not distinguish between procedures and data; procedures are just data, which are themselves active. As the body of information being dealt with grows and becomes more active, it becomes critical that the program environment, consisting of complex objects interconnected with rich pointer structures, survives for long periods of time. Mapping and moving of such rich environments into today's file system or database for long-term retention would involve substantial translation overhead, both in space and time.

Thus, there is a substantial difference between the representations of objects in the computational and long-term storages for symbolic/AI applications. The richer the structure of computational objects, the greater the difference and the bigger the effort needed to perform translation between these two representations. Emerging symbolic and AI applications will employ increasingly sophisticated and complex structures on a large number of objects on which retrievals, queries, inferences, reasoning, deductions, and computations will be performed. As can be anticipated, the overhead to map long-term objects into computational objects and vice-versa for large knowledge-intensive applications could be substantial.

The current approach taken by many researchers to facilitate knowledge-based applications is based on connecting a symbolic computer to a database machine. This approach is not based on persistent memory, as it neither addresses the storage dichotomy issues nor deals with the lifetime or interchangeability of procedure and data issues. There will be a mismatch between the data model requirements of symbolic/AI applications and the rigid data models supported by database machines. Therefore, such approach appears to be inadequate for expert database systems. These reservations are shared by other researchers in the field.

The persistent memory approach is based on a fundamentally different foundation. The literature on persistent memory dates back to 1962, when Kilburn proposed single-level storage, in which all programs and data are named in a single context. (T. Kilburn, "One Level Storage System", IRE Trans. Electronic Comput., vol. EC-11, no. 2, April, 1962) Saltzer proposed a direct-access storage architecture, where there is only a single context to bind and interpret all objects. (J. H. Salzer, "Naming and Binding of Objects", in R. Bayer et al, editors, Operating Systems, An Advanced Course, p. 99, Springer-Verlag, New York, NY, 1978.

Traiger proposed mapping databases into virtual address space. (I. L. Traiger, "Virtual Memory Management for Database Syatems", ACM Operating Syatems Review, pp. 26–48, October, 1982.) It seems that the simple data modeling requirements of the FORTRAN and COBOL worlds discouraged productization of these proposals because they are much more difficult to implement than the conventional virtual memory and database systems.

The MIT MULTICS system and the IBM System/38 have attempted to redude the storage dichotomy. However, both have major shortcomings for symbolic computing; unlike LISP machines, each process has its own address space. All persistent information is in files. A file mapped into the address space of a process cannot hold a machine pointer to a file mapped in the address space of a different process. Thus, sharing of information among different processes is more difficult than with LISP machines. Furthermore, there is no automatic garbage collection, which is essential for supporting symbolic languages.

Recently, many researchers have proposed implementing persistent objects on top of a file system provided by the host operating system. Though persistent and transient objects still reside in two separate storage organizations, persistent objects can be of any general type, such as number, vector, array, record, or list, and can be manipulated with a common programming language such as ALGOL or LISP. However, there is a large overhead to access persistent objects because their pointers must be dereferenced by software, taking several machine cycles.

Therefore, it is an object of the present invention to present a storage model suitable for symbolic computing. It is an object of the present invention to provide an improved memory system architecture which presents an abstraction of a uniform memory to the user. It is a further object of the present invention that all of such memory be uniformly addressable, and there be no separate portions thereof which must be treated by a user in a different way. It is another object of the present invention that such memory be capable of retaining selected objects for a long period. It is yet another object of the present invention that such memory be capable of the actual use of references from existing objects to objects which have been explicitly deleted. It is yet a further object that there need not exist separate files or databases which are not located in the address space of the memory.

Therefore, in order to accomplish these and other objectives, a persistent memory according to the present invention is based on a very large virtual address space. All memory objects are located in this space. A special object, the persistent root, indicates which objects are to be retained beyond the lifetime of the program which creates them. Deleted objects are marked as tombstoned, but are not entirely deleted until it is ascertained that no references to those objects are outstanding. Such memory system is especially suitable for use in symbolic computers. It can be also useful for data intensive numerical or business-oriented applications.

The novel features which characterize the present invention are defined by the appended claims. The foregoing and other objects and advantages of the invention will hereinafter appear, and for purposes of illustration, but not limitation, a preferred embodiment is shown in the drawing.

DESCRIPTION OF THE PREFERRED EMBODIMENT

Figure 1:
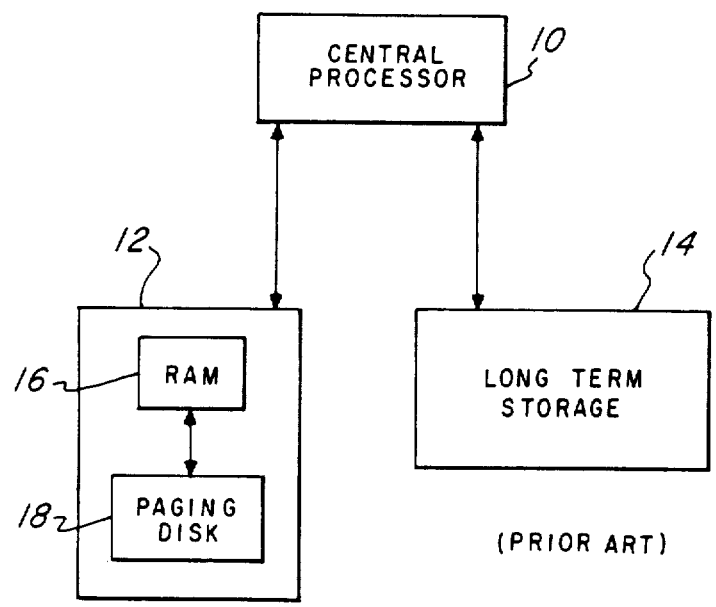
FIG. 1 is a block diagram of a prior art computer memory system architecture.

FIG. 1 shows a prior art computer architecture having separate computational and long-term storages. A central processor 10 has access to computational storage 12 and long-term storage 14. Long-term storage 14 is for retaining files, databases, etc., and is usually implemented as one or more disks backed up by magnetic tape. Computational storage 12 is a virtual memory, usually implemented as a fast semiconductor RAM memory 16 and a paging disk 18. The computational storage 12 appears to the central processor 10 as a very large RAM. Virtual memory addresses which are not actually in the semiconductor memory 16 are located on the paging disk 18 and loaded into the semiconductor memory 16 when they are referenced by the central processor 10.

Figure 2:
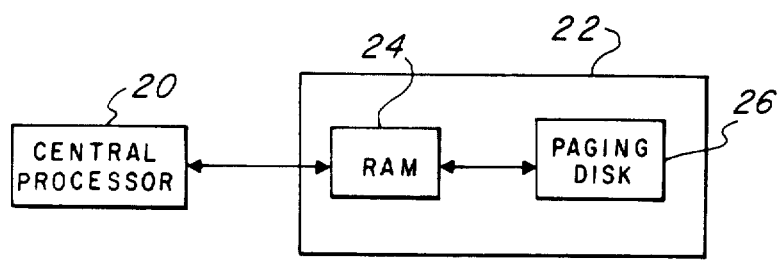
FIG. 2 is a block diagram of a computer architecture according to the present invention.

FIG. 2 shows a computer system having an architecture according to the present invention. A central processor 20 (CPU) has access only to a single, uniform memory 22. The memory 22 preferably consists of a very large virtual memory, having semiconductor RAM 24 backed up by a paging disk 26. The CPU 20 may be an existing system, such as an EXPLORER symbolic processor from Texas Instruments. The virtual memory 22 appears to the CPU 20 as a uniform, or single-level, memory store with a linear address space.

The uniform memory abstraction defines the storage system architecture necessary to implement a persistent memory according to the present invention. The persistent memory system is based on the uniform memory abstraction, in which a processor views memory as a set of variable-sized blocks, or objects, of memory interconnected by pointers. The memory system has a very large address space to support large knowledge-based applications. The persistent memory system is expected to store persistent objects, including "files," which could be very large in number and size. Therefore, the size of the underlying address space should be sufficiently large to support a practical system. However, the concept of persistent memory does not depend on the actual size of the address space.

As previously explained, all processes within a symbolic computer share the same single, linear address space. This allows a rich, complex structure of objects interrelated by pointers, to be created and manipulated. The structure of memory objects interconnected by pointers forms a graph. Pointers interconnecting memory objects are implemented as virtual addresses of the target objects.

Figure 3:
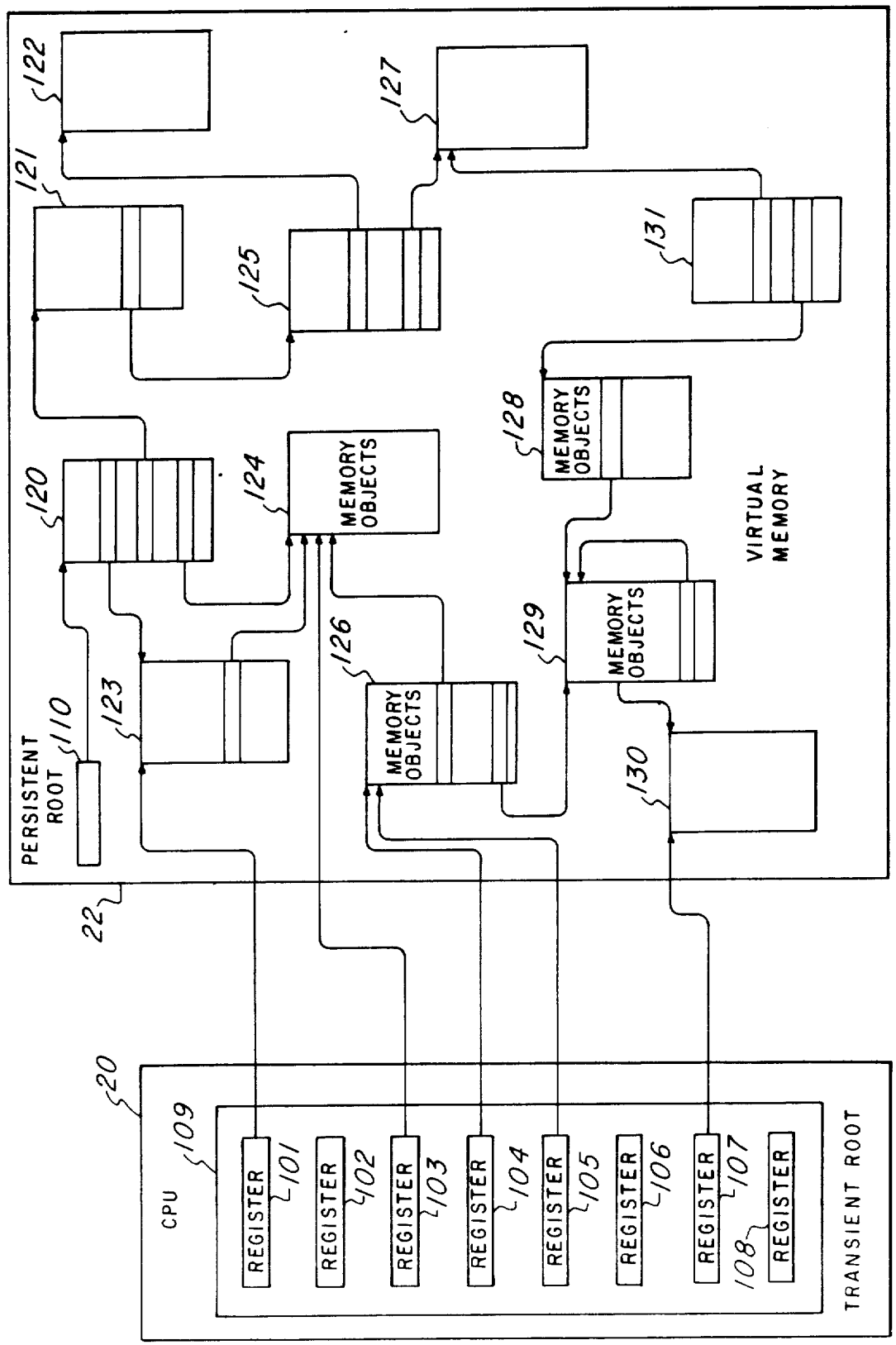
FIG. 3 is a block diagram of a uniform, persistent memory according to the present invention.

As shown in FIG. 3, there is a distinguished object in the uniform memory abstraction, called the persistent root 110, which defines persistent objects, The persistent root 110 is a distinguished object located at a fixed virtual address and disk location. All objects that are in the transitive closure of the persistent root, i.e., reachable from the persistent root by following pointers, are persistent. The persistent root survives system shutdowns or crashes. Typically, the persistent root may contain a pointer to a table that points to other tables or structures of persistent objects and so on. Thus, the persistent root anchors all persistent objects.

The persistence attribute of an object depends solely on whether that object can be prevented from being garbage collected even after the program that created it has terminated; this can be easily arranged by making that object a member of the set of objects in the transitive closure of the persistent root. Persistence based solely on the persistent root rather than the properties of the storage medium allows a complete separation of the persistence attribute of an object from its type of relationship with other objects. Numbers, characters, lists, procedures, environments, etc., can be persistent objects while they exist in virtual memory.

Therefore, an invocation of a procedure as a persistent object is as easy and efficient as its invocation as a transient object. In fact, from the machine point of view, transient and persistent objects are indistinguishable. From the user point of view, there is no need to treat transient and persistent objects differently; all the user needs to know is that to make an object persistent, it has to be in the transitive closure of the persistent root.

The processor contains a number of "registers." (101–108 are shown) The processor can access a memory object, i.e., read and write its individual words, if any of its registers holds a pointer to the object. The word register in this context is used in a generic sense; it may be a hardware register or a scratch-pad memory in the processor. These registers define the transient root number of the memory system. They do not survive a system shutdown or crash. All objects that are in the transitive closure of the transient root, but not in the transitive closure of the persistent root, are called transient. All the remaining objects are garbage and are reclaimed by a garbage collector.

FIG. 3 shows an example snapshot of the memory system and categorizes objects within it. The arrows between objects and from CPU registers to objects represent pointers. Pointers always refer to the beginning of the object pointed to. Thus, the four pointers pointing into object 124, for example, all have the same value and point to the beginning of block 124. By determining the transient closure of the persistent root 110, and the transient root number, it is seen that objects 126, 129 and 130 are transient; objects 120, 121, 122, 123, 124, 125, and 127 are persistent; and objects 128 and 131 are garbage.

Each memory object consists of one or more memory words, or cells, which are stored in consecutive virtual addresses. The processor 20 can access a memory object, i.e., read and write its individual words, if any of its registers holds a pointer to the object. For example, one method of accessing individual cells is as follows. If register 101 contains a pointer to a memory object 123, then the processor 20 can read the third word of the memory object 123 by executing a READ (1, 3) instruction, where "1" specifies the processor register 101, and "3" specifies the third word of the memory object 123, pointed to by register 101. The contents of register 101 are added to "3" to develop the virtual address of the word to be read. Similarly, the processor 20 can write data in the fourth word of the memory object 123 by executing a WRITE (1, 4), data instruction. The processor 20 can access memory objects only via logical addresses; a logical address consists of a pair (i, j), where "i" is the identification number of a processor register, and "j" indicates the j-th word of an object being pointed at by processor register "i."

The notion of memory objects in the uniform memory abstraction corresponds to objects used in high-level programming languages, such as numbers, booleans, characters, strings, LISP CONS cells, arrays, records, procedures, or environments. These language-level objects can be implemented using one or more memory objects interconnected by pointers. Application-level objects are constructed by combining language-level objects.

The persistence property of objects is based solely on whether or not an object is within the transitive closure of the persistent root 110. The persistence attribute of an object is a fundamental notion. It should depend only on whether the object can survive beyond the life time of a program that creates it. It should neither depend on the type of the object nor on the properties of the storage medium on which the object resides. Since there will usually be several sets of unrelated groups of objects which are persistant, the persistant root 110 will usually first point to an object which contains nothing more than pointers to persistant objects. Any object, transient or persistent, can point to any other object to facilitate the unrestricted sharing desired in many symbolic/AI computations.

In contrast to this mechanism of achieving persistence of objects based solely on the persistent root, in today's machines, both conventional and symbolic, an object becomes persistent only when it is stored in the long-term storage, i.e., disk store. Even in MULTICS or IBM-System/38, only certain types of objects, i.e., files, can become persistent, while other types of objects, such as procedures, cannot.

With the persistent root 110, the persistence attribute of an object solely depends on whether that object can be prevented from being garbage collected even when the program that created it has terminated; this can be easily arranged by making that object a member of the set of objects in the transitive closure of the persistent root 110.

The transience/persistence attribute of objects is not necessarily a permanent attribute. An object may be created as a transient object, then it can become a persistent object solely on the basis of being in the transitive closure of the persistent root 110, and then can revert back to the transient state by getting out of the transitive closure of the persistent root 110, and so on.

Each pointer, implemented as a virtual address, is tagged as a pointer within memory. This tagging mechanism is used to ensure that the processor cannot specify, fabricate, or forge a pointer. The processor is allowed to access memory only by reference to logical memory blocks. There may be additional tagging information associated with each object to indicate its type, such as integer, floating point number, string, array, list, or closure. This tagging information is used to ensure that attempts to perform operations that are undefined or illegal on a particular object type cause traps to appropriate exception handling routines; for example, an attempt to add an integer to a string object would cause an exception. Each memory reference can be checked for bounds, i.e., "j" in a logical address (i, j) should not exceed the size of the object pointed to by processor register "i."

The nature of the memory system requires that it be garbage collected, and be free from the so-called dangling reference problem. Garbage collection is essential to be able to make computational progress in a finite amount of memory space. Without the reclamation and reuse of memory space occupied by an object proven to be garbage (i.e., no outstanding pointers to the object from non-garbage objects), the system would eventually come to a grinding halt as it ran out of memory. Garbage collection is preferably done automatically in real time, and preferably as a process executing concurrently with user processes. This is not necessary to the invention, however, and garbage collection can occur during periods of machine non-use, such as overnight.

The dangling reference problem arises if the memory space for an explicitly deleted object is reclaimed without proving that there are no outstanding pointers to that object. If the space occupied by a deleted object is reclaimed prior to such a proof, then the outstanding pointers to the object may point to empty space, i.e., unallocated memory, or to some undesired object if the reclaimed space has been later allocated to the new object. In either case, the memory system integrity would be violated.

The proof that there are no outstanding pointers to a deleted object is embedded within the garbage collector. A deleted object is specially marked as tombstoned when it is deleted. All of the outstanding pointers to a tombstoned block are detected by the garbage collector and then destroyed. When no pointers to a tombstoned block are left, its space is automatically reclaimed.

The notion of the integrity of the memory system refers to the integrity of the structure of the graph of memory objects interconnected by pointers. Under this notion, the integrity of the memory system is preserved because it is impossible to forge a pointer, no information outside the bounds of an object can be accessed, undefined or illegal operations for any object type cause appropriate exception handling actions, and there is no dangling reference problem. Therefore, the graph of memory objects undergoes transition only from one consistent state to another, ensuring its structural integrity.

The uniform memory abstraction achieves its goal of being able to manipulate both transient and persistent objects with equal ease, flexibility and efficiency because words of a memory object pointed to by a processor register can be accessed with equal ease and speed, independent of whether the object is transient or persistent. Therefore, an invocation of a procedure as a persistent object is as easy and efficient as its invocation as a transient object. In fact, as far as the machine is concerned, there is no distinction in processing transient and persistent objects. The uniform memory abstraction allows the same set of flexible and powerful operations on transient and persistent objects from a single programming language. New procedures can be invoked as persistent objects or transient objects. None of the prior art systems can do this; in those systems, access to persistent objects is considerably slower or more complicated than access to transient objects.

A description of a specific, preferred implementation follows. This implementation is especially suited for use with symbolic computers. In this embodiment, a 40-bit address is used, resulting in approximately one trillion words of storage. The word size is 48 bits.

TABLE I

| | 47 | 44 | 43 | 40 | 30 | 34 | 33 | 28 | 27 | 0 |
|---|---|---|---|---|---|---|---|---|---|---|
| H | mem. tag | | block tag | | Ext. block tag | | g.c. bits | | Block-size | |
| U1 | mem. tag | | CPU tag | | | | | | "Data" | |
| U2 | mem. tag | | CPU tag | | | | | | "Data" | |
| U3 | mem. tag | | CPU tag | | | | | | "Data" | |
| U1 | mem. tag | | CPU tag | | | | | | "Data" | |

Table I shows the organization of a block, and the words, or cells, within the block. As shown in Table I, the least significant bit of a word is bit 0, with the most significant bit being bit 47.

The first cell of a block is the header cell, labeled H in Table I. The Header cell is accessed by using Index=0, that is, with a logical address (reg., 0), wherein reg. is a CPU register as described above. Depending upon the particular implementation, some blocks may not have headers in order to conserve storage space. This might be the case with, for example, one word integers.

In the Header Cell, bits <47:44> contain a memory tag. Various memory tags can be assigned as indicated in Table II. A memory tag of <0100> indicates that this is a Header Cell. Bits <43:40> contain a block tag indicating block-level properties, such as, for example, identifying the block as an array or a LISP cons cell. Bits <39:34> are used to indicate additional block-level properties, and act as an extended block tag. Bits <33:28> are reserved for use by the garbage collection mechanism to keep any needed information related to garbage collection. Bits <27:0> indicate the block size of this particular block. With the described header structure, blocks may have a maximum length of $2^{28}$ words, including the header cell.

The virtual address of the Header cell of an object defines the pointer to the object. All pointers, whether held in CPU registers or in other objects, must point to the virtual address of the header cell. As described above, the remainder of the cells within the object are accessed by indexing from the header cell.

In Table I, the cells of the block are labeled U1, U2, ... Un−1. The value "n" is the number of cells in the block, including the header cell. Every cell has a memory tag in bits <47:44>, a CPU tag in bits <43:40>, and "data" in bits <39:0>. The data field can contain data such as numbers or characters, instructions, or pointers to other objects. The interpretation of the value in the data part of the cell is determined by the value in the memory tag portion.

If the data in the cell is actually what is usually considered as data, such as numbers and characters, the CPU tag indicates the type of data in the cell. Typical data types are integer, character, Boolean, and real number. The CPU tag is used by the CPU 20 to determine valid operations on cells during processing. A CPU tag value of "0000" indicates that that cell contains a status value. The nature of the status value is indicated in the data field. When a cell is initialized, the CPU tag is initialized to be "0000", and bits <39:0> are all set to zero to indicate a status value of "initialized".

The meanings of various memory tags are shown in Table II. A memory tag of "0000" indicates that the data field actually contains data, of a type determined by the CPU tag. If bit 47 is a 1, the data field contains a pointer. "0010" indicates an instruction, and "0100" indicates a header as described above.

In the preferred embodiment, a real time, copying garbage collector is used. In order to assist such a garbage collector, a memory tag showing garbage collect-forward ("0101") can be used. Copying garbage collection algorithms move blocks of data from one place to another within memory. Since other objects point to the original location of the object garbage collected, the memory tag of the header is changed to indicate garbage collect-forward, and a forwarding address is placed in the old object location. When a reference is made to a cell within a block having a garbage collect-forward status, the memory management system automatically performs an indirect reference. This forwarding reference remains until the garbage collection system has found and relocated all pointers to the original block location.

The garbage collector must be able to trace the transitive closure of both the persistent root and the transient root. This needs only a minor change for standard garbage collection algorithms, which must trace the transitive closure of the transient root.

TABLE II

| Bit | | | | |
|---|---|---|---|---|
| 47 | 46 | 45 | 44 | Memory Tag |
| 0 | 0 | 0 | 0 | Data |
| 0 | 0 | 1 | 0 | Instruction |
| 0 | 1 | 0 | 0 | Header |
| 0 | 1 | 0 | 1 | Garbage Collect-Forward |

When a block is deallocated, the block tag of the header cell, is assigned to the status ("0000") value, and bits <39:0> of the header cell, are set to a "tombstone" value. Only the header is marked as tombstoned, and rest of the space is reclaimed. The tombstone value can be, for example, all ones in bits <39:0>. This indicates that a block has been explicitly deallocated, but that the garbage collection process has not yet located all pointers pointing to it. When the garbage collection process locates these pointers they are destroyed. An attempt to access a tombstoned block generates a trap to an appropriate error handling routine.

This tombstone mechanism solves the dangling reference problem described above. When a block is deallocated, retaining its header in a tombstoned state until the system is assured that all pointers to the deallocated block have been removed insures that a pointer to a no longer existing object does not point to empty space or erroneous information which may have been later written into the virtual memory space previously occupied by the deallocated block. Attempts to acess a deallocated block should result in an error message which is precisely what happens using the tombstoning mechanism just described. This helps insure the integrity of the memory.

Figure 4:
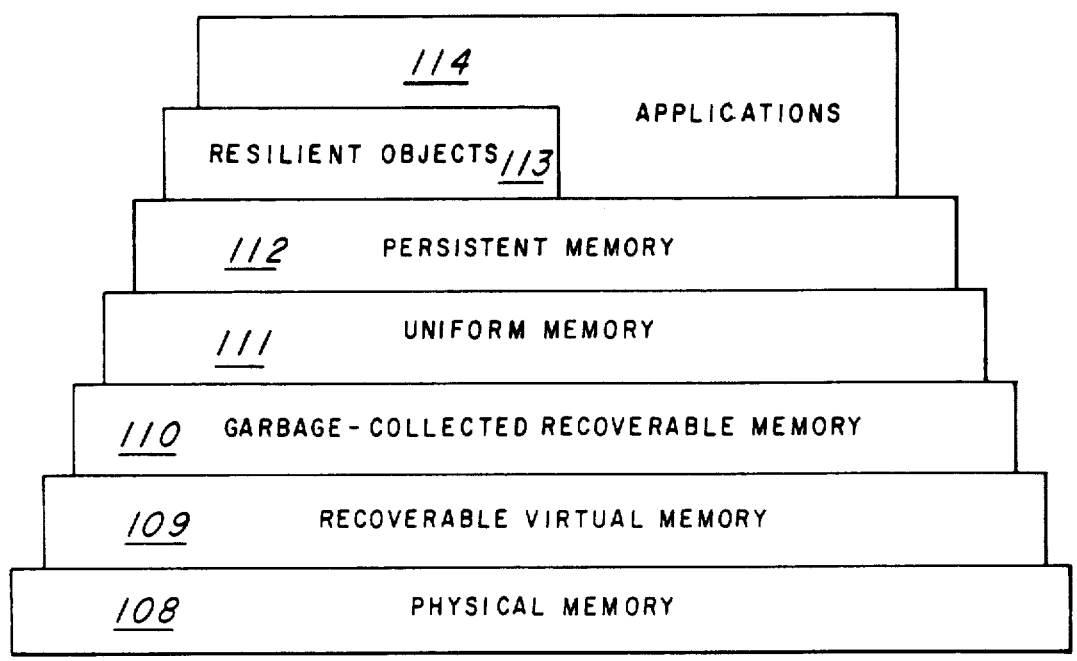
FIG. 4 illustrates a hierarchy of memory abstractions.

The relationship between the parts of the overall memory system, including the uniform and persistent memory, just described, and the recoverable virtual memory, described below, is illustrated in FIG. 4. Various levels of viewing the system are shown as a hierarchy of memory abstractions.

At the lowest level is the actual physical memory 108: the main semiconductor RAM memory 24 and the paging disk 26. The next level of abstraction is the recoverable virtual memory 109 as described below. The next level 110 shows garbage collection of the virtual memory, which can be done by one of several methods. The abstraction of uniform memory 111 is one of several that can be implemented on top of a recoverable virtual memory. The persistent memory 112 described above is implemented as the next layer of abstraction, and the concept of resilient objects 113, as described in copending U.S. application entitled RECOVERABLE VIRTUAL MEMORY, by Thatte et al, Ser. No. 774,827, filed Sept. 11, 1985 and assigned to the assignee of the present application, which application is hereby incorporated herein by reference, is implemented on the persistent memory 112. Finally, user applications 114, such as expert database systems, are implemented at the top of the hierarchy.

TECHNICAL ADVANTAGES

The present invention allows the use of a uniform memory abstraction, which does not use files not directly addressable in the virtual memory address space. This allows all objects to be manipulated in the same way, without the necessity for translation overhead between long-term memory and computational memory.

Although a preferred embodiment has been described in detail, it is understood that various substitutions, additions and modifications may become apparent to those skilled in the art. These changes may be made without departing from the spirit and scope of the invention, which is defined by the appended claims.

What is claimed is:

1. A persistent memory for a computer system, comprising:
   a linear address space having a plurality of consecutively numbered memory locations;
   a plurality of memory blocks allocated within said linear address space, wherein each block consists of at least one memory location, wherein each block has one associated location addressable by pointers, and wherein a plurality of said blocks contain pointers to other memory blocks; and
   a persistent root located in said linear address space, wherein said persistent root can contain a pointer to one of said allocated memory blocks, and wherein all allocated memory blocks which are in a transitive closure of said persistent root are not subject to reclamation by the computer system;

wherein the computer system can access said memory blocks only through pointers pointing at the associated addressable location, and can access a selected memory location only by calculating an offset from an addressable location associated with one of said memory blocks.

2. The persistent memory of claim 1, wherein said linear address space comprises a virtual address space having a plurality of consecutively numbered virtual memory locations.

3. The persistent memory of claim 2, wherein said virtual address space comprises:
   a semiconductor memory having numbered physical memory locations that correspond to selected virtual memory locations; and
   a paging disk having information stored thereon that has associated virtual memory locations.

4. The persistent memory of claim 1, wherein said allocated blocks can be identified as tombstoned when they are deallocated, and wherein tombstoneed blocks are released for reuse only after all pointers to the deallocated blocks are changed or deleted.

5. The persistent memory of claim 4, wherein blocks copied as a result of a garbage collection process can be marked to include a forwarding address pointing to a new copy.

6. A computer system having a persistent memory, comprising:
   a central processing unit;
   a virtual memory coupled to said central processing unit and having a plurality of consecutively numbered memory locations; and
   a plurality of memory blocks located in said virtual memory, said blocks consisting of at least one memory location, said blocks having one location addressable by pointers, a plurality of said blocks containing pointers to other blocks, and said blocks being marked as tombstoned when they are deallocated, wherein such marked blocks are released for reuse only after all pointers to such blocks are changed or deleted.

7. The computer system of claim 6, wherein blocks which are copied elsewhere in memory can be marked to include a forwarding address to a new copy.

8. A computer system having a persistent memory, comprising:
   a central processing unit;
   a virtual memory coupled to said central processing unit, and having a plurality of consecutively numbered memory locations;
   a plurality of memory objects located in said virtual memory, said objects each having at least one of the memory locations, said objects each having a single associated location addressable by pointers, a plurality of said objects containing pointers to other objects, and said objects being marked as tombstoned when they are deallocated, wherein such marked objects are released for reuse only after all pointers to such objects are changed or deleted; and
   a persistent root located in said virtual memory, said persistent root containing a pointer to one of said memory objects, wherein all of said objects which are in a transitive closure of said persistent root are protected from reclamation by the computer system;
   wherein the computer system can access said memory objects only through pointers pointing at the associated addressable locations, and can access a selected memory location only by referencing a calculated offset from one of said addressable locations.

9. The computer system of claim 8, further wherein the calculated offset from an addressable location cannot exceed a predetermined value associated with such addressable location.

10. The computer system of claim 8, wherein a persistence attribute can be applied to an object solely because such object cannot be garbage collected.

11. The computer system of claim 8, wherein said objects are manipulated in the same manner by the CPU regardless of whether such objects are within the transistive closure of said persistent root.

* * * * *